U. S. SMITH.
POWER TRANSMISSION MECHANISM.
APPLICATION FILED DEC. 1, 1916.

1,285,822.

Patented Nov. 26, 1918.
2 SHEETS—SHEET 1.

WITNESS
Bernard Privat

INVENTOR.
Ulysses S. Smith
BY Percy Webster
ATTORNEY

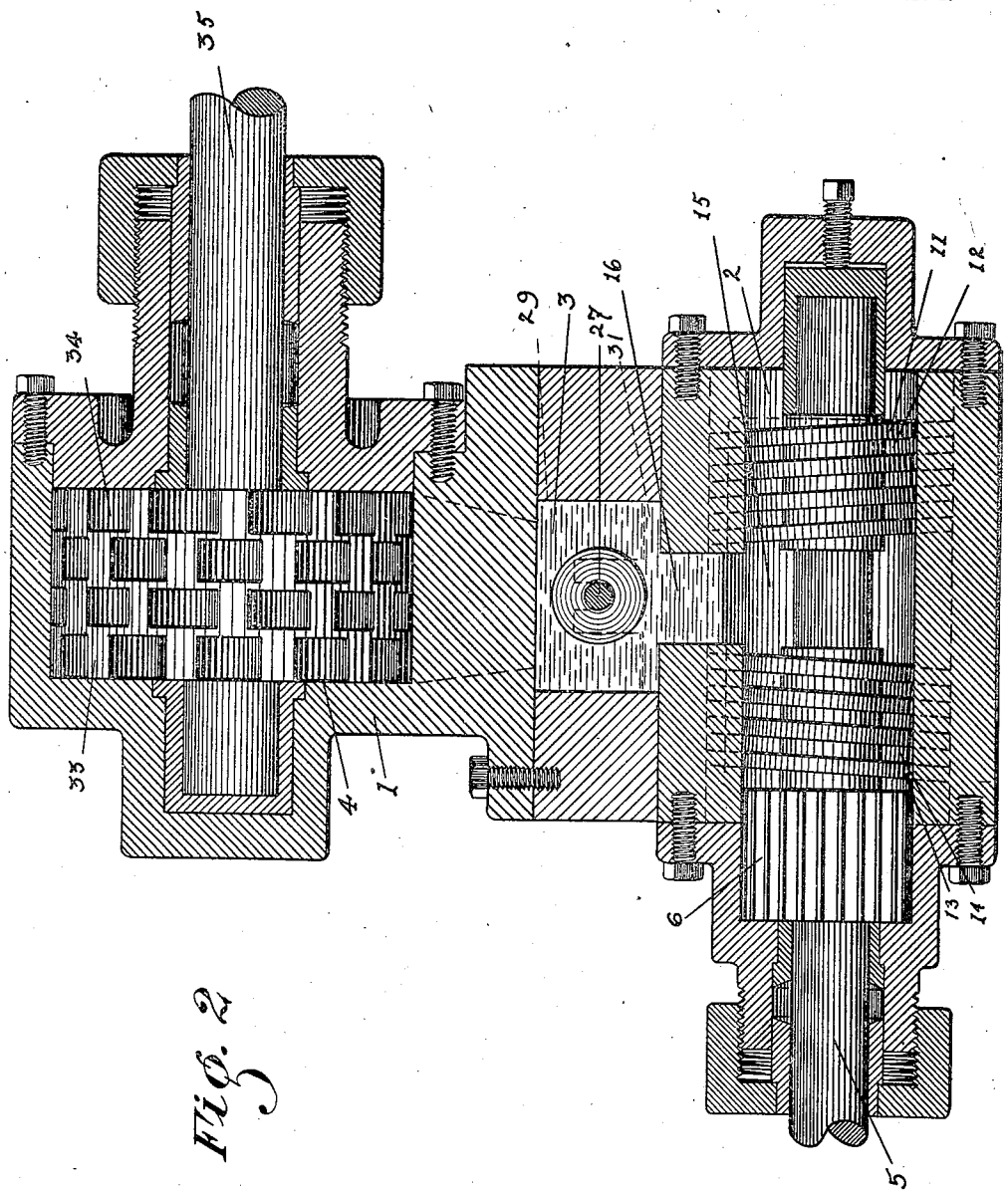

UNITED STATES PATENT OFFICE.

ULYSSES S. SMITH, OF SACRAMENTO, CALIFORNIA, ASSIGNOR OF ONE-TENTH TO ADOLPH C. KAUFMAN, ONE-TENTH TO CULVER A. DE COE, ONE-TENTH TO ANDREW A. McCOLLUM, ONE-TENTH TO FREDERICK J. JOHNS, ONE-TENTH TO FRANK M. QUIMBY, ONE-TENTH TO ANTONE MARTY, ONE-TENTH TO HENRIETTA E. TERRY, ONE-TENTH TO JOHN M. HUESTED, AND ONE-TENTH TO VIOLET McCOLLUM, ALL OF SACRAMENTO, CALIFORNIA.

POWER-TRANSMISSION MECHANISM.

1,285,822.      Specification of Letters Patent.      Patented Nov. 26, 1918.

Application filed December 1, 1916. Serial No. 134,273.

*To all whom it may concern:*

Be it known that I, ULYSSES S. SMITH, a citizen of the United States, residing at Sacramento, in the county of Sacramento, State of California, have invented certain new and useful Improvements in Power-Transmission Mechanism; and I do declare the following to be a full, clear, and exact description of the same, reference being had to the accompanying drawings, and to the characters of reference marked thereon, which form a part of this specification.

This invention relates to improvements in means for transmitting power from a driving element such as an electric motor, gas engine or the like, to the various driven elements, the object of the invention being to produce such a transmission element as will be operable by fluid pressure without the necessity of having any clutches, co-acting gears, belt, or any of the other various now commonly used forms of transmission mechanisms requiring mechanical changes for varying the speed and power.

My improved mechanism is designed to use fluid pressure for transmitting the power in such a manner as to allow a complete and accurate control of the speed and power without frictional wear on the parts, and also one in which the speed and power can be controlled if desired without modifying the speed of the initial power. The invention will further allow of the speed and power being modified in such a graduated scale as to allow of the exact operation desired thus doing away with the step by step change of gears now ordinarily employed.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Fig. 2 is a side view of the same, with the housing likewise broken away and in section.

Figure 1:
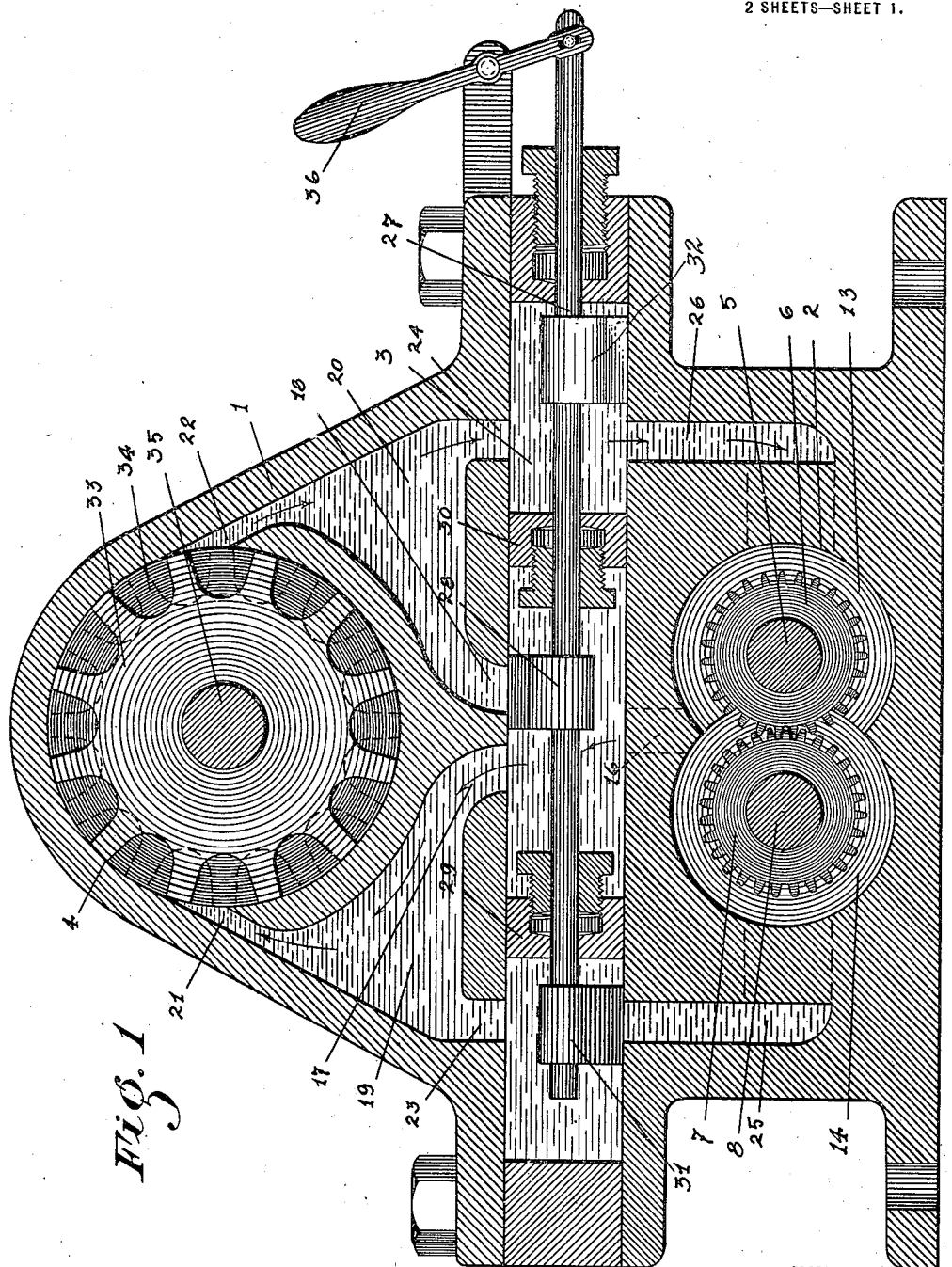
Figure 1 is an end view of the structure showing the housing cut away and in section so as to display the complete internal workings of the device.

Referring now more particularly to the characters of reference on the drawings, the numeral 1 designates the housing for the mechanism which may be of any suitable material and which for the purposes of my improved invention is provided with a screw chamber 2, a valve chamber 3, and a gear chamber 4 arranged substantially one above the other as indicated.

The numeral 5 designates the driving shaft operated by the initial power, such as a gas engine or any other well known form of power, which projects into the housing 1 and is provided with suitable journals and packing of any desired form. Within the screw chamber 2 the shaft 5 is provided with a driving gear 6 which intermeshes with and drives another gear 7 mounted on a shaft 8. The shafts 5 and 8 are suitably journaled in parallel relation within the screw chamber 2 and are provided with suitable bearings and adjustments of any common form. Secured to the shafts 5 and 8 within the screw chamber 2 are pairs of screw members 11—12 and 13—14 respectively, the members of each pair intermeshing one with the other, as shown in Fig. 1. These two pairs of screw members are spaced apart with respect to each other forming an intermediate space 15. From the space 15 a port 16 leads into the valve chamber 3. From the valve chamber 3 two ports 17 and 18 lead into intermediate chambers 19 and 20 from which intermediate chambers 19 and 20 ports 21 and 22 lead into the gear chamber 4 from opposite sides. Also from the intermediate chambers 19 and 20 ports 23 and 24 lead back into the chamber 3 and alined with the ports 23 and 24 are ports 25 and 26 leading from the chamber 3 back into the opposite sides of the screw chamber 2. Slidably disposed within the chamber 3 is a valve stem 27 having a valve 28 common to the ports 17 and 18 and arranged to open or close said ports in a manner as will hereinafter appear.

On each side of the valve 28 are packing abutments 29 and 30 respectively to shut off communication from the ports 16 and 17 and the ports 23, 24, 25 and 26. On one end of the valve stem 27 is a valve 31 arranged to control the open or closed condition of the port 25. On the opposite end of such stem 27 is a similar valve 32 arranged to control the open and closed condition of the port 26. Within the gear chamber 4 is a driven gear consisting of a cylindrical member 33 provided with a plurality of cups 34 in its circumference, such cups 34 being arranged in staggered relation as shown.

The driven shaft 35 is fixed to the gear 33 and projects through suitable packing and journaled members to any desired point.

In practice the housing is filled with a suitable fluid, preferably oil of any desired consistency, and this fluid is driven through the gear 33 in such a manner as to cause it to drive the shaft 35. This operation is substantially as follows, viz:

Assuming that the power from the shaft 5 is to be transmitted to the shaft 35 in that direction commonly known as the forward direction, the parts would be substantially as shown in Fig. 1. In this position the port 25 would be closed and the ports 16, 17, 21, 22, 24 and 26 would all be opened in a continuous line. With the forward movement of the shaft 5, this would drive the gears 6, and 7, and would cause the intermeshing screws to travel in such a direction as to pump the fluid from the port 26 and force it toward the center space 15, thence through the port 16, ports 17 and 21 into the gear 33, which action would rotate the said gear 33 and incidentally the shaft 35. With the rotation of the gear 33 the fluid would discharge into the port 22 and thence be pumped through the ports 24 and 26 back into the screw chamber 22, as described.

During this operation the port 18 would of course be closed by the valve 28 and the port 25 by the valve 31.

Assuming now that the reverse direction of the shaft 35 was desired, a handle member 36 or other suitably controlled device would be used to move the stem 27 so that the valve 28 would be moved to open the port 18 and close the port 17, and the valve 31 would be moved to open the port 25, and the valve 32 moved to close the port 26. When this was done the action of the screws would then pump the fluid through the ports 16, 18 and 22 into the gear 33 driving such gear in the reverse direction. The fluid would then discharge through the port 21 and be pumped through the port 23 into the port 25.

When neither forward or reverse action of the shaft 35 is desired, then the valve 28 may be moved to extend equally over the ports 17 and 18, and this would cause the forcing of the fluid equally against each side of the gear 33, the valves 31 and 32 being then partway of their respective ports 25 and 26 to allow of a free circulation of the liquid. This latter position of the parts would also be that assumed for the neutral position of the transmission mechanism.

As will be readily noted, the action of the intermeshing screws forms a very effective force for driving the fluid in one direction and incidentally acts as a pump for drawing it back into the screw chamber from the opposite direction.

From the foregoing description it can readily be seen that I have produced such a device as substantially fulfils the objects of the invention as set forth herein.

While this specification sets forth in detail the present and preferred construction of the device still in practice such deviations from such detail may be resorted to as do not form a departure from the spirit of the invention, as defined by the appended claims.

Having thus described my invention what I claim as new and useful and desire to secure by Letters Patent is:

1. In a fluid pressure transmission mechanism, a casing, a fluid driving member and a driven member arranged in the casing, the casing having a valve chamber arranged between the two, such chamber being divided into three parts, the casing being provided with three ports each communicating from the driving member to one part of the valve chamber, the casing also having two ports in communication with the driven member, each of the last named ports having a pair of branches, one branch of each pair communicating with the center part of the valve chamber the other branches each communicating with one of the other parts, and a valve mechanism arranged to control the relative open and closed condition of the ports with respect to the valve chamber to direct the flow of the fluid under pressure.

2. In a fluid pressure transmission mechanism, a casing, a fluid driving member and a driven member arranged in the casing, the casing having a valve chamber arranged between the two, such chamber being divided into three parts, the casing being provided with three ports each communicating from the driving member to one part of the valve chamber, the casing also having two ports in communication with the driven member, each of the last named ports having a pair of branches, one branch of each pair communicating with the center part of the valve chamber the other branches each communicating with one of the other parts, a valve mechanism arranged to control the relative open and closed condition of the ports with respect to the valve chamber to direct the flow of the fluid under pressure, such mechanism including a valve stem slidable through all the parts of the valve chamber, a valve on the stem within the center part of the chamber movable over the first named branch ports to open or close communication between either of them and the valve chamber, and a valve on the stem within each of the other parts of the valve chamber and movable over the ports from the driving member to open or close communication through either of them into the valve chamber.

In witness whereof I affix my signature.

ULYSSES S. SMITH.